(12) United States Patent
Sabin et al.

(10) Patent No.: US 11,141,011 B2
(45) Date of Patent: Oct. 12, 2021

(54) HEAT RETAINING DISH ASSEMBLY AND METHOD OF HEATING SAME

(71) Applicant: Tempra Technology, Inc., Bradenton, FL (US)

(72) Inventors: Cullen M. Sabin, Bradenton, FL (US); Alan James Maskell, Venice, FL (US)

(73) Assignee: Tempra Technology, Inc., Bradenton, FL (US)

( * ) Notice: Subject to any disclaimer, the term of this patent is extended or adjusted under 35 U.S.C. 154(b) by 0 days.

(21) Appl. No.: 15/520,598

(22) PCT Filed: Oct. 21, 2015

(86) PCT No.: PCT/US2015/056688
§ 371 (c)(1),
(2) Date: Apr. 20, 2017

(87) PCT Pub. No.: WO2016/069349
PCT Pub. Date: May 6, 2016

(65) Prior Publication Data
US 2017/0303710 A1    Oct. 26, 2017

Related U.S. Application Data

(60) Provisional application No. 62/069,531, filed on Oct. 28, 2014.

(51) Int. Cl.
*A47G 19/02*     (2006.01)
*A47J 36/24*     (2006.01)
(Continued)

(52) U.S. Cl.
CPC ........ *A47G 19/027* (2013.01); *A47J 36/2494* (2013.01); *C09K 5/063* (2013.01); *H05B 6/1209* (2013.01)

(58) Field of Classification Search
CPC ... A47G 19/027; A47J 36/2494; C09K 5/063; H05B 6/1209; H05B 6/10
See application file for complete search history.

(56) References Cited

U.S. PATENT DOCUMENTS 1,049,385 A * 1/1913 Mohrenwitz ........ A47G 19/027
                                                    126/375.1
1,370,722 A * 3/1921 Adam ................. A47J 36/2494
                                                    126/400
(Continued)

OTHER PUBLICATIONS

Neal Anderson, "Technology Assessment: Technology Viable To Keep "Take-Home" Food Warm For 30 Minutes" attached as Anderson_Technology_Assessment_2003.pdf (Year: 2003).*

(Continued)

*Primary Examiner* — Avinash A Savani
*Assistant Examiner* — Martha M Becton
(74) *Attorney, Agent, or Firm* — Sheehan Phinney Bass & Green PA

(57) ABSTRACT

A dish assembly for serving food includes a dish housing that defines a surface, upon which the food can be placed, and an inner compartment, a phase-change material within the inner compartment, and an electrically-conductive element inside the inner compartment and thermally coupled to the phase-change material. In a typical implementation, the phase-change material is adapted to melt in response to the electrically-conductive element being heated by an electromagnetic induction heater. The thus heated dish assembly can facilitate getting hot food to a table while it is still hot, and once at the table, keeping that hot food at least warm for quite some time, while it is consumed.

29 Claims, 6 Drawing Sheets

(51) Int. Cl.
C09K 5/06 (2006.01)
H05B 6/12 (2006.01)

(56) References Cited

U.S. PATENT DOCUMENTS

| | | | | |
|---|---|---|---|---|
| 2,279,000 A * | 4/1942 | Larson | A47J 27/18 | 126/378.1 |
| 3,034,499 A * | 5/1962 | Scavullo | A47J 36/2494 | 126/375.1 |
| 3,054,395 A * | 9/1962 | Torino | A47G 23/0683 | 126/375.1 |
| 3,148,676 A * | 9/1964 | Truog | A47J 41/0044 | 126/246 |
| 3,356,828 A * | 12/1967 | Furness | F24H 7/0208 | 126/400 |
| 3,463,140 A * | 8/1969 | Rollor, Jr. | A47G 19/2288 | 126/246 |
| 3,463,161 A * | 8/1969 | Andrassy | A61F 7/02 | 126/400 |
| 3,557,774 A * | 1/1971 | Kreis | A47G 19/027 | 126/246 |
| 3,569,669 A * | 3/1971 | March | B63C 11/28 | 126/204 |
| 3,603,106 A * | 9/1971 | Ryan | A47G 19/2288 | 126/400 |
| 3,689,738 A * | 9/1972 | Laing | F24C 15/34 | 126/400 |
| 3,720,198 A * | 3/1973 | Laing | C09K 5/06 | 126/400 |
| 3,805,018 A * | 4/1974 | Luong | A47J 47/14 | 206/545 |
| 4,020,310 A * | 4/1977 | Souder, Jr. | H05B 6/06 | 219/621 |
| 4,199,548 A * | 4/1980 | Kaiho | A01N 25/20 | 422/305 |
| 4,220,196 A * | 9/1980 | Gawron | C09K 5/063 | 126/400 |
| 4,241,782 A * | 12/1980 | Schoenfelder | F28D 20/02 | 126/400 |
| 4,246,884 A * | 1/1981 | Vandas | A47J 36/2494 | 126/246 |
| 4,253,983 A * | 3/1981 | Blanie | C09K 5/063 | 106/285 |
| 4,299,715 A * | 11/1981 | Whitfield | C09K 5/06 | 165/185 |
| 4,324,287 A * | 4/1982 | Schroder | C09K 5/063 | 165/10 |
| 4,326,975 A * | 4/1982 | Cadet | C09K 5/063 | 106/268 |
| 4,355,627 A * | 10/1982 | Scarlata | F28D 20/0034 | 126/400 |
| 4,528,439 A * | 7/1985 | Marney, Jr. | A45C 11/20 | 165/902 |
| 4,979,923 A * | 12/1990 | Tanaka | A61F 7/007 | 219/201 |
| 4,982,722 A * | 1/1991 | Wyatt | A47J 36/2494 | 126/400 |
| 4,983,798 A * | 1/1991 | Eckler | A47G 23/04 | 219/730 |
| 5,052,369 A * | 10/1991 | Johnson | A47J 36/2494 | 126/400 |
| 5,290,904 A * | 3/1994 | Colvin | B32B 27/06 | 428/68 |
| 5,424,519 A * | 6/1995 | Salee | C09K 5/063 | 219/759 |
| 5,440,975 A * | 8/1995 | Bean | A47J 36/2494 | 126/246 |
| 5,611,328 A * | 3/1997 | McDermott | A47J 36/2494 | 126/246 |
| 5,750,962 A * | 5/1998 | Hyatt | F28D 20/028 | 219/528 |
| 5,856,653 A * | 1/1999 | Boudreaux | F27B 17/02 | 219/386 |
| 5,884,006 A * | 3/1999 | Frohlich | H05B 3/68 | 392/339 |
| 5,892,202 A * | 4/1999 | Baldwin | A47J 36/2483 | 219/387 |
| 5,901,699 A * | 5/1999 | McDermott | A47J 36/2494 | 126/246 |
| 5,954,984 A * | 9/1999 | Ablah | H05B 6/12 | 219/621 |
| 6,072,938 A * | 6/2000 | Peterson | F24H 3/004 | 392/343 |
| 6,108,489 A * | 8/2000 | Frohlich | A47J 47/145 | 392/346 |
| 6,310,329 B1 * | 10/2001 | Carter | A47G 19/2288 | 219/430 |
| 6,329,644 B1 * | 12/2001 | Hyatt | F28D 20/028 | 219/528 |
| 6,353,208 B1 * | 3/2002 | Bostic | A47J 47/145 | 126/400 |
| 6,391,442 B1 * | 5/2002 | Duvall | C09K 5/063 | 257/E23.089 |
| 6,400,896 B1 * | 6/2002 | Longardner | F28D 20/02 | 126/400 |
| 6,414,278 B1 * | 7/2002 | Frohlich | A47J 39/02 | 219/387 |
| 6,433,313 B1 * | 8/2002 | Owens | A47J 47/145 | 219/387 |
| 6,434,970 B1 * | 8/2002 | Hasegawa | A47F 10/06 | 62/457.6 |
| 6,512,211 B1 * | 1/2003 | Lockhart | H05B 6/12 | 219/387 |
| 6,615,906 B1 * | 9/2003 | Fieback | A01K 5/0114 | 165/10 |
| 6,616,999 B1 * | 9/2003 | Freuler | B32B 7/06 | 165/104.19 |
| 6,634,417 B1 * | 10/2003 | Kolowich | B65D 81/3846 | 165/10 |
| 6,652,705 B1 * | 11/2003 | Freuler | C08K 3/04 | 106/272 |
| 6,865,906 B1 * | 3/2005 | Sabin | C09K 5/04 | 62/480 |
| 7,108,438 B2 * | 9/2006 | Fontaine | A45D 40/265 | 219/424 |
| 7,176,426 B2 * | 2/2007 | Ramirez | A47G 19/027 | 126/246 |
| 7,285,753 B2 * | 10/2007 | Hoehne | A47J 39/006 | 219/386 |
| 8,263,906 B2 * | 9/2012 | Jarvis | A47J 39/006 | 219/385 |
| 8,759,725 B2 * | 6/2014 | Tamura | H05B 6/6402 | 219/635 |
| 9,181,015 B2 * | 11/2015 | Booska | B65D 81/3484 | |
| 9,782,036 B2 * | 10/2017 | Alexander | A47J 36/2433 | |
| 9,801,482 B1 * | 10/2017 | Alexander | H05B 1/0244 | |
| 10,182,674 B2 * | 1/2019 | Alexander | A47G 19/2288 | |
| 2003/0113556 A1 * | 6/2003 | Feng | C08L 83/04 | 428/447 |
| 2003/0152764 A1 * | 8/2003 | Bunyan | C09K 5/063 | 428/328 |
| 2003/0203188 A1 * | 10/2003 | H. | C09K 5/063 | 428/328 |
| 2004/0195678 A1 * | 10/2004 | Yamazaki | C09K 5/063 | 257/720 |
| 2005/0072334 A1 * | 4/2005 | Czubarow | C09K 5/063 | 106/270 |
| 2008/0047956 A1 | 2/2008 | Dudman | | |
| 2008/0063879 A1 * | 3/2008 | Lin | C08G 77/388 | 428/447 |
| 2009/0250189 A1 * | 10/2009 | Soukhojak | C09K 5/063 | 165/10 |
| 2010/0133464 A1 * | 6/2010 | Tomura | C09K 5/063 | 252/70 |
| 2011/0281485 A1 * | 11/2011 | Rolland | C09K 5/063 | 442/181 |

(56) References Cited

U.S. PATENT DOCUMENTS

2012/0216981 A1* 8/2012 Bank ............... C09K 5/063
          165/10
2014/0230484 A1* 8/2014 Yavitz ............ A47G 19/2288
          62/457.4
2014/0238652 A1  8/2014 Agostini

OTHER PUBLICATIONS

International Search Report and Written Opinion for PCT/US15/56688, dated Jan. 14, 2016.

* cited by examiner

HEAT RETAINING DISH ASSEMBLY AND METHOD OF HEATING SAME

CROSS-REFERENCE TO RELATED APPLICATION

This application claims priority to U.S. Provisional Patent Application No. 62/069,531, which was filed on Oct. 28, 2014 and was entitled, Dinner Plate with Heat Storage and Method of Heating. The disclosure of the prior application is hereby incorporated by reference in its entirety herein.

FIELD OF THE INVENTION

This disclosure relates to a heat retaining dish assembly and, more particularly, relates to a heat retaining dish assembly that can facilitate getting hot food to a table while it is still hot, and once at the table, keeping that food hot or least warm for quite some time, while it is consumed.

BACKGROUND

Hot food is a staple in almost any dining situation. Whether you are in a restaurant, a friend's house, or at home, hot food is very popular. It is generally desirable that food intended to be hot should remain hot, when it is served and whilst it is being consumed. This has been and continues to be a major challenge to anyone tasked with trying to serve hot food.

SUMMARY OF THE INVENTION

In one aspect, a dish assembly for serving food includes a dish housing that defines a surface, upon which the food can be placed, an inner compartment, a phase-change material within the inner compartment, and an electrically-conductive element inside the inner compartment which is thermally coupled to the phase-change material.

In a typical implementation, the phase-change material is adapted to melt in response to the electrically-conductive element being heated by an electromagnetic induction heater. Moreover, typically, the electrically-conductive element is sufficiently large that when the electrically-conductive element is heated by the electromagnetic induction heater, all (or at least a significant amount, e.g., 80% or more) of the phase-change material melts.

Typically, the phase-change material is sufficiently close to the food placement surface that at least some of the heat emitted from the phase-change material as it freezes after having been melted is absorbed by food on the food placement surface.

The phase-change material can be wax, a hydrated inorganic salt, or other type of material that undergoes a phase change in appropriate conditions. In some implementations, the phase-change material changes phase at a temperature in the range of 45 degrees Celsius to 80 degrees Celsius and, more preferably, in the range of 50 degrees Celsius to 70 degrees Celsius.

The electrically-conductive element can be, for example, metal wool, metal foil with openings, metal screen or a corrugated, mesh sheet, such as iron or the like. The electrically conductive element does not generally change phase when the phase-change material changes phase.

The dish housing can be made from any one or more of a variety of different materials. In a typical implementation, the dish housing is an electrically insulative material. Moreover, in a typical implementation, the phase-change material and the electrically-conductive element are completely enclosed by a material (e.g., the housing) that is electrically insulative.

In some implementations, the phase-change material fills, or at least substantially fills the inner compartment. In some implementations, the phase-change material is in direct physical contact with a surface of the dish housing opposite the food placement surface. In a typical implementation, the phase-change material is thermally coupled to the surface of the dish housing opposite the food placement surface.

The inner compartment typically has a diameter that is between 70% and 90% of a diameter of the dish housing. A rim typically extends in an outward direction from the portion of the dish assembly where the inner compartment is located. The inner compartment can be enclosed by a cover (lower) portion of the dish housing.

In another aspect, a system includes a dish for serving food, and an electromagnetic induction heater that is able to be positioned proximate the dish. The dish includes a dish housing that defines a surface, upon which the food can be placed, and an inner compartment, a phase-change material within the inner compartment; and an electrically-conductive element inside the inner compartment and thermally coupled to the phase-change material. The induction heater is operable to melt the phase-change material.

In a typical implementation, the induction heater is able to melt the phase-change material by producing a changing electromagnetic field that induces electrical current flow in the electrically-conductive element to heat and melt the phase-change material within the housing when the dish is placed on the induction heater.

In yet another aspect, a method includes providing a dish assembly for serving food. The dish assembly includes a dish housing that defines a surface, upon which the food can be placed, and an inner compartment, a phase-change material within the inner compartment, and an electrically-conductive element inside the inner compartment and thermally coupled to the phase-change material. The method also includes melting the phase-change material with an electromagnetic induction heater.

In a typical implementation, the phase-change material is melted by applying a changing electromagnetic field to the electrically-conductive element with the electromagnetic induction heater. The changing electromagnetic field typically induces electrical current flow in the electrically-conductive element to create heat and melt the phase-change material.

The method also may include placing food on the food placement surface. After melting, the phase-change material gives off heat to the food on the food placement surface and, over time, freezes.

In some implementations, one or more of the following advantages are present.

In a typical implementation, the dish assembly, and related technology, disclosed herein can facilitate getting hot food to a table while it is still hot, and once at the table, keeping that hot food at least warm for quite some time, while it is consumed. This, of course, has been and continues to be an ongoing challenge to the food service industry, particularly in restaurants and the like. Several methods for addressing this issue have been proposed and used.

One such method involves preheating the plate that the food gets served ion in an oven or other heating device, placing the food, and then serving the plate immediately. When this is done, however, the server usually must use a glove or a napkin as an insulator to handle the hot plate.

Moreover, the plate can be very hot when it reaches the diner and, therefore, poses a safety risk.

Another method involves placing a plate loaded with food on a shelf under a heating lamp until it is ready to be delivered to the diner. With this method, however, the heating lamp is hot and potentially dangerous. Additionally, the food may be warmed in preference to the plate, which can be expected to cool to the temperature of the shelf. Often with this method the surface of the food dries reducing the quality for the consumer.

With any of these methods, the plate and the food on the plate may be expected to cool down very quickly in transit and after it reaches the table.

In a typical implementation, the dish assembly disclosed herein and related concepts overcome certain shortcomings associated with traditional approaches for keeping food warm, and help facilitate getting hot food to a table while it is still hot, and once at the table, keeping that hot food at least warm for quite some time. Accordingly, food loaded onto a hot dish can be held at a palatable temperature long enough not only to serve the food to a table, but to keep the food warm during consumption.

Since the rim of the dish typically extends outward from the portion of the dish assembly where the inner compartment is located, the rim can stay relatively cool, particularly as compared to the portion of the dish assembly that acts as the food serving portion. This makes the dish assembly easy to handle carry, by waiters and waitresses, for example, even without having a glove or napkin to protect their fingers and hands.

Other features and advantages will be apparent from the description and drawings, and from the claims.

BRIEF DESCRIPTION OF THE DRAWINGS

Like reference characters refer to like elements.

DETAILED DESCRIPTION

Figure 1:
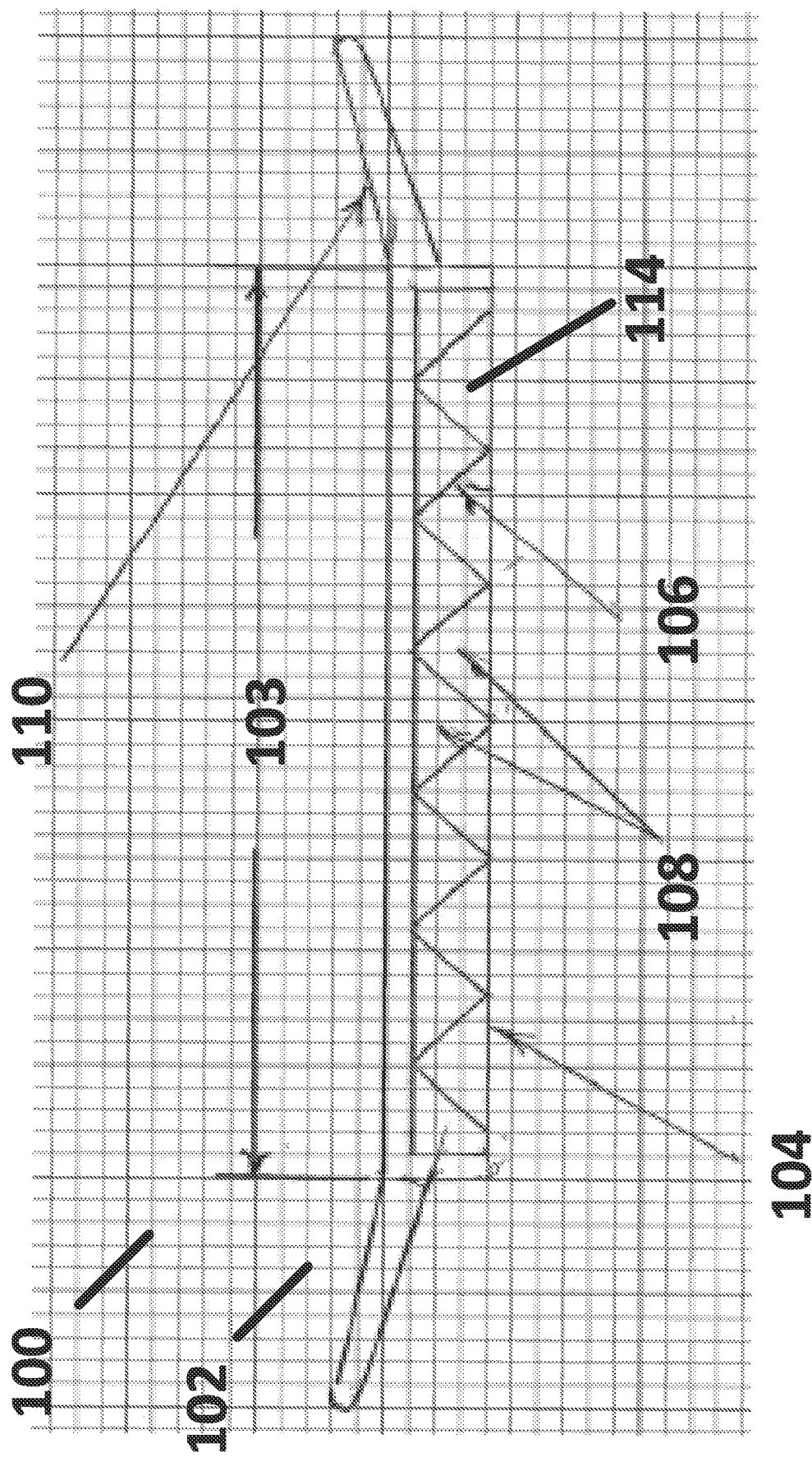
FIG. 1 is a side, cross-sectional view of an exemplary dish assembly.
Figure 2:
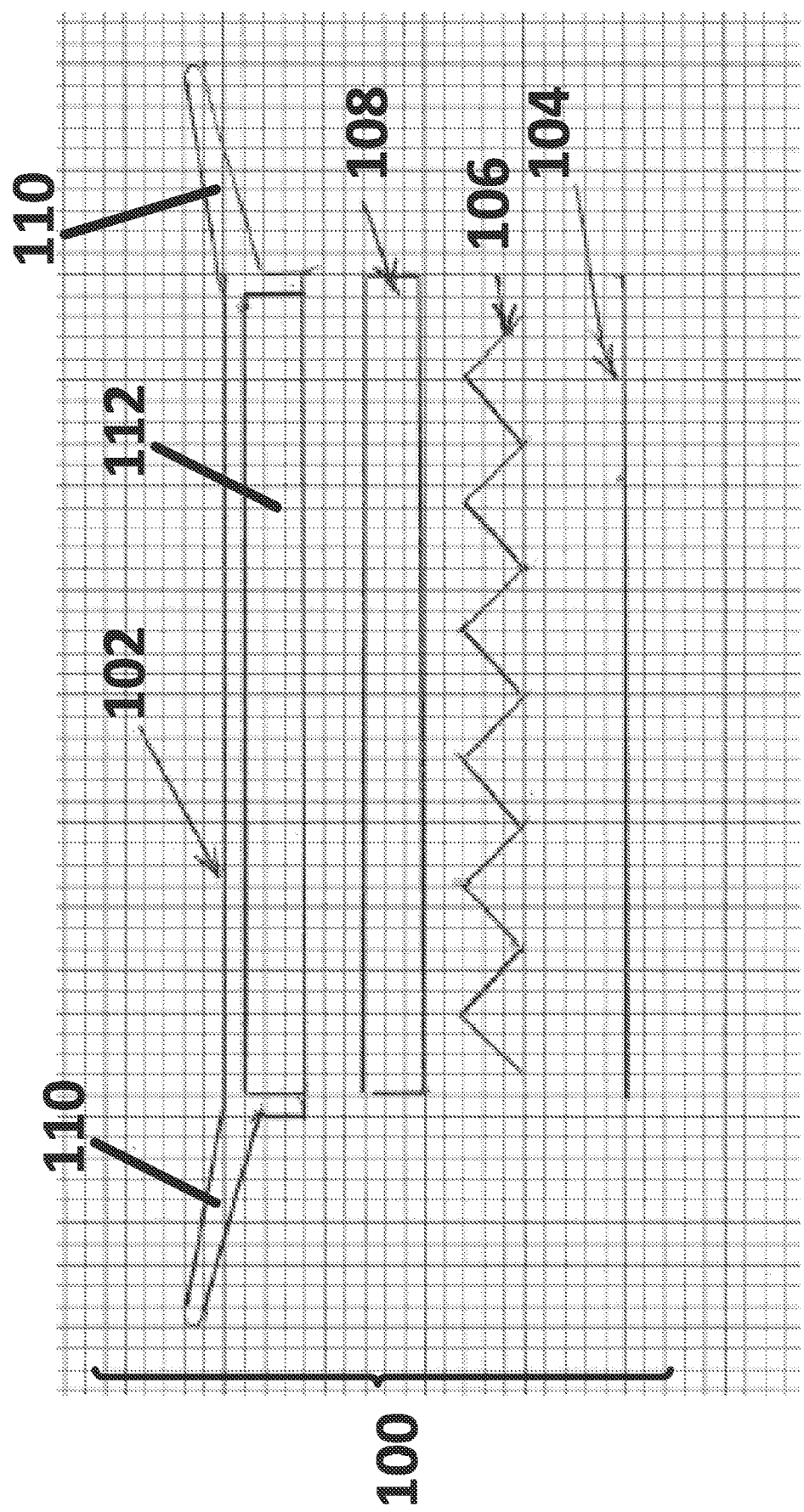
FIG. 2 is a side, cross-sectional, exploded view of the exemplary dish assembly in FIG. 1.

FIGS. 1 and 2 illustrate an exemplary dish assembly 100 that includes an upper portion 102 and a lower portion 104. In a typical implementation, the illustrated dish assembly 100 helps facilitate getting hot food to a table while it is still hot, and once at the table, keeping that hot food at least warm for quite a long time.

The upper portion 102 of the dish assembly 100 defines an upwardly-facing, substantially flat, centrally disposed food serving area/surface 102, a rim 110 that extends outward from and surrounds the food serving area 103, and a substantially cylindrical, downwardly-facing compartment 112 with an open bottom opposite the food serving area 103.

The lower portion 104 of the dish assembly 100 is a substantially flat disk configured to fit into the open bottom of the downwardly-facing compartment 112 and to seal that compartment 112 in at least a fluid-tight (i.e., impervious to fluid). The lower portion 104 of the dish assembly 100 and the upper portion 102 of the dish assembly 100 are configured so that they can be connected to each other to define a sealed internal compartment 114, as shown in FIG. 2. This seal can be accomplished using any one or more of a variety of different sealing technologies including, for example, mating screw threads with a sealant, suitable adhesives, etc.

There is an electrically-conductive element 106 and a phase-change material 108 inside the sealed internal compartment 114.

The electrically-conductive element 106 can take any one of a variety of different forms and can be made from any one or more of a variety of different materials. In a typical implementation, the electrically-conductive element 106 is a solid structure that substantially retains its shape and structural integrity at every temperature that the electrically-conductive element 106 is routinely exposed to. In one exemplary embodiment, like the one represented in FIGS. 1 and 2, the electrically-conductive element 106 is a corrugated disk made of iron-based wire mesh.

In a typical implementation, the electrically-conductive element 106 can be characterized by its ability to be heated by an electromagnetic induction style heater that is external to the dish assembly 100. Moreover, the amount of heating that can be achieved in a typical implementation is sufficient to cause the phase-change material 108, which is also in the sealed internal compartment 114, to undergo at least a partial, if not complete, change in phase (e.g., from solid to liquid or from liquid to gas).

In the illustrated implementation, the electrically-conductive element 106 is corrugated (i.e., shaped into alternate ridges and grooves). Moreover, in the illustrated implementation, the alternate ridges and grooves extend substantially from the bottom of the sealed internal compartment 114 to the top of the sealed internal compartment 114. This sort of arrangement can facilitate even heating of the phase-change material 108, particularly when the phase-change material 108 fills, or substantially fills, the sealed internal compartment 114.

In a typical implementation, the electrically-conductive element 106 is a wire mesh (i.e., made from wire with evenly spaced holes that allow fluid to pass through it). Wire mesh can be a desirable configuration because it allows the phase-change material 108 to move rather freely throughout the sealed internal compartment 114, for example, as it melts and subsequently re-solidifies.

The electrically-conductive element 106 can be any one or more of a variety of different kinds of materials. One such example is iron; however, there are other examples.

The electrically-conductive element 106 typically extends across the entire, or substantially the entire, inner compartment of a dish assembly. Moreover, it typically has a similar shape as the inner compartment where it is located. For example, if the inner compartment is cylindrical, then the electrically-conductive element 106 may be a circular, corrugated mesh disk.

The phase-change material 108 can take any one of a variety of different forms and can be made from any one or more of a variety of different materials. In a typical implementation, the phase-change material 108 is configured to transition between phases (e.g., solid and liquid, or liquid and gas) depending on the specific temperature conditions that routinely occur in the sealed internal compartment 114.

In a typical implementation, the phase-change material 108 can be characterized by its ability to change phase (e.g., melt) when exposed to temperatures that occur as a result of the electrically-conductive element 106 being heated by an external electromagnetic induction heater. In some implementations, the phase-change material 108 is configured to change phase at a temperature in the range of 45 degrees Celsius to 80 degrees Celsius and, more preferably, in the range of 50 degrees Celsius to 70 degrees Celsius.

In a typical implementation, the phase-change material 108 fills, or at least substantially fills, the sealed internal compartment 114 of the dish assembly 100. Moreover, in a typical implementation, there is at least enough phase-change material 108 in the sealed internal compartment 114 to at least partially cover the electrically-conductive element 106.

In some implementations, the phase-change material 108 is a wax. Waxes are generally solid, but malleable near ordinary ambient temperatures. Characteristically, they melt above 45° C. (113° F.), or thereabouts, into a somewhat low viscosity liquid. In various implementations, other kind of materials (e.g., one or more hydrated inorganic salts) can be used that would undergo a phase change when exposed to temperatures resulting from the heating of the electrically-conductive element 106. If the electrically-conductive element 106 is a wire mesh, then it may be desirable for the wax, when melted, to reach a viscosity such that it can flow rather freely through the wire mesh.

The electrically-conductive element 106 is thermally coupled to the phase-change material 108 inside the sealed internal compartment 114. In a typical implementation, the thermal coupling is achieved by virtue of the electrically-conductive element being in direct physical contact with the phase-change material. Indeed, in some implementations, the electrically-conductive element is immersed, or at least partially covered, by the phase-change material 108 inside the sealed internal compartment 114.

The electrically-conductive element 106 can be heated in any one or more of a variety of different ways. In one exemplary implementation, the electrically-conductive element 106 can be heated by an electromagnetic induction style heater located outside the dish assembly. Generally speaking, electromagnetic induction heating refers to the process of heating an electrically conducting object, such as the electrically-conductive element 106 inside dish assembly 100, electromagnetic induction. (e.g., with heat being generated inside the element by eddy currents, etc.).

Figure 3:
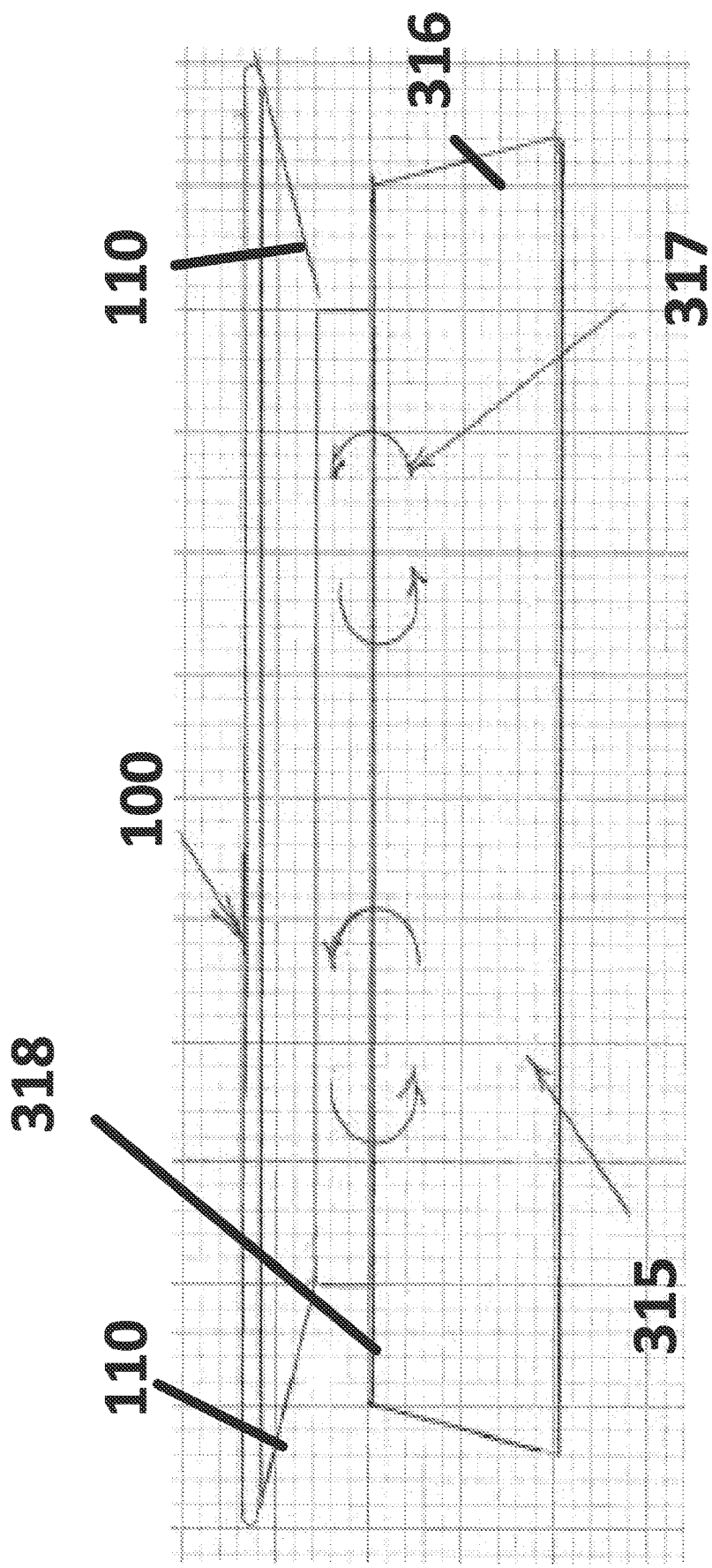
FIG. 3 is a side view of the exemplary dish assembly in FIG. 1 sitting atop an exemplary electromagnetic induction neater.

FIG. 3 shows a heating arrangement, whereby dish assembly 100 is sitting atop an exemplary electromagnetic induction heater 315. In the illustrated example, the electromagnetic induction heater 315 is able to heat the electrically-conductive element 106 by virtue of the coil in the electromagnetic induction heater 315 electromagnetically coupling (see 317) to the electrically-conductive element 106, which causes the flow of electrical current in the electrically-conductive element 106 that heats and, eventually, melts the phase-change material 108, which is also inside the dish assembly 100.

The illustrated electromagnetic induction heater 315 has a housing 316 that defines an upward facing support surface 318 for holding an object to be heated, which, in the illustrated example, is the dish assembly 100. In a typical implementation, the electromagnetic induction heater 315 has an internal electromagnet (not shown in FIG. 3) near the support surface 318. Moreover, in a typical implementation, the electromagnetic induction heater has an electronic oscillator (also not shown in FIG. 3) that passes, during operation, a high-frequency alternating current (AC) through the electromagnet. The resulting alternating magnetic field is able to penetrate the dish housing (i.e., the upper and/or lower portions of the dish assembly) causing electrical current to flow inside the electrically-conductive element of the dish assembly 100 and heat the electrically-conductive element. This heat causes the phase-change material to change phase.

The phase-change material inside the dish assembly 100 can be melted before or after food is placed onto the dish assembly 100. After the phase-change material 108 has been melted and the dish assembly 100 has been removed from the electromagnetic induction heater 315, if food on the food serving area 103 of the dish assembly 100 is below a certain temperature, then heat from the phase-change material 108 will pass through the upper portion of the dish assembly and into the food to help keep the food warm. In a typical implementation, in giving up this heat, the phase-change material 108 undergoes a phase-change (e.g., from liquid to solid). Accordingly, a large amount of heat, known as latent heat, can be transferred into the food without the phase-change material 108 experiencing any change in temperature. Thus, the complete assembly 100 has a high heat capacity to keep hot food warm.

EXAMPLES

Two different plates were tried in testing. One was a 12-inch diameter pottery plate, which broke after a few tests because, it is believed that, conduction of heat within the plate is quite small and the material of construction was incapable of tolerating the thermal stresses generated by the radial temperature differences. The test hardware was therefore subsequently modified to use a Corel dinner plate that was 10.25 inches in diameter. In both cases the underside of the plate was provided with a 6.75 inch inside diameter plastic dam glued to its underside. The dams were about 0.4 inches deep. A corrugated steel mesh insert was placed within the dam, and a 77 degree C. (170 degree F.) melting point wax was poured into the remaining space. A hydrated salt, such as ammonium aluminum, with a melting point of 93.5 degree C. (200 degrees F.), could have been used instead, but some corrosion protection for the iron may have been needed in that case. After the wax solidified, a plastic film sheet was bonded to the dam circumference to enclose the thermal storage medium. The thermal storage system added 230 grams to the plate.

The modified Corel plate was placed on a tabletop induction heater from Aurora for the test work. Instrumentation for the test consisted of three thermocouples, all on the top face of the plate. One was placed at the center of the plate on the topside, one two inches radially outward, and the third two inches radially beyond that. The third thermocouple was ⅝ inch outside of the thermal storage area.

Figure 4:
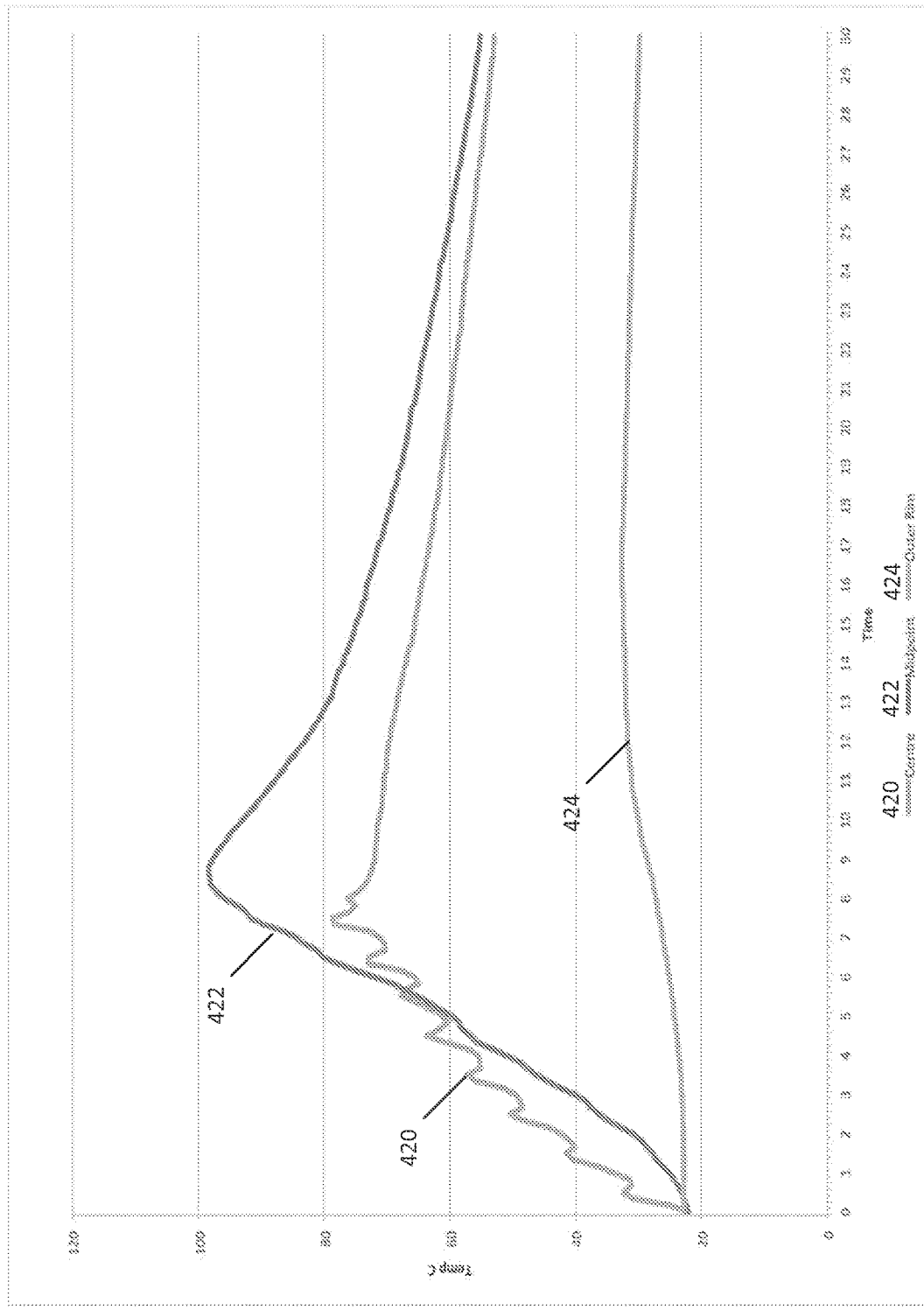
FIG. 4 is a plot of temperature vs. time, taken with three thermocouples, for an exemplary dish assembly.

FIG. 4 shows results of the test on the Corel plate. In the illustrated chart, the centre line 420 shows temperatures measured by the thermocouple at the center of the plate, the midpoint line 422 shows temperatures measured by the thermocouple two inches radially outward from the center of the plate, and the outer rim line 424 shows temperatures measured by the thermocouple two inches radially outward from the midpoint thermocouple.

As shown, the high point of the "centre" line is just less than 80 degrees C.; the high point of the "midpoint" line is just less than 100 degrees C.; and the "outer rim" line remains well below 40 degrees C. in FIG. 4.

The heat input for this run was about 53 watts. Power was cut off at about 7.5 minutes. For no obvious reason, the radiation distribution pattern over the surface of the induction heater was very non-uniform, so that the heating off-center (e.g., the midpoint line) is much greater than the heating on-center (e.g., the centre line). There was a ridge in the corrugated screen directly under the center thermocouple, so that the pulsations in the heater power can be seen clearly in the trace for the center thermocouple. The Aurora heater operates at full power, so that lower power settings are achieved by pulsing the power on and off. Heating times would be expected to be less if heating were uniform.

The outer rim line is from the third thermocouple, which was ⅝ inch outside of the heat storage area. It may be seen that radial conduction outside of the heated area was very small.

Within the area over the thermal storage unit, the temperature of the plate was maintained above the target minimum temperature of 54 degrees C. for 30 minutes. The thermal conductivity of the ceramic and pottery plates tested is relatively poor, so that the rim remained cool in all tests. This feature generally allows easy handling of the heat-storage plate with bare hands.

Figure 5:
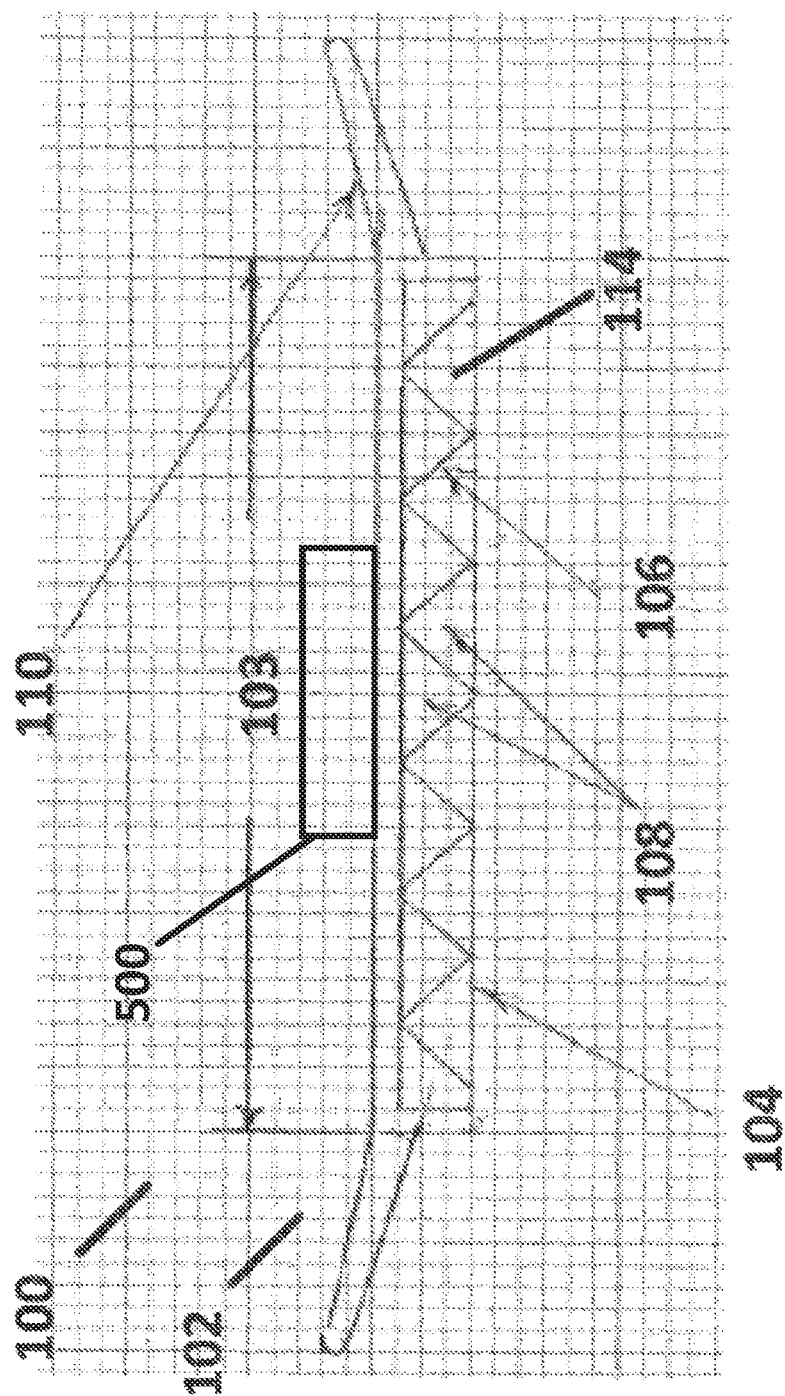
FIG. 5 is a side, cross-sectional view of an exemplary dish assembly with food in direct physical contact with its food placement surface.

FIG. 5 is a side, cross-sectional view of a dish assembly that is identical to the dish assembly 100 in FIG. 1. FIG. 5, however, also shows food 500 in direct physical contact with the food placement surface of the dish assembly 100.

Figure 6:
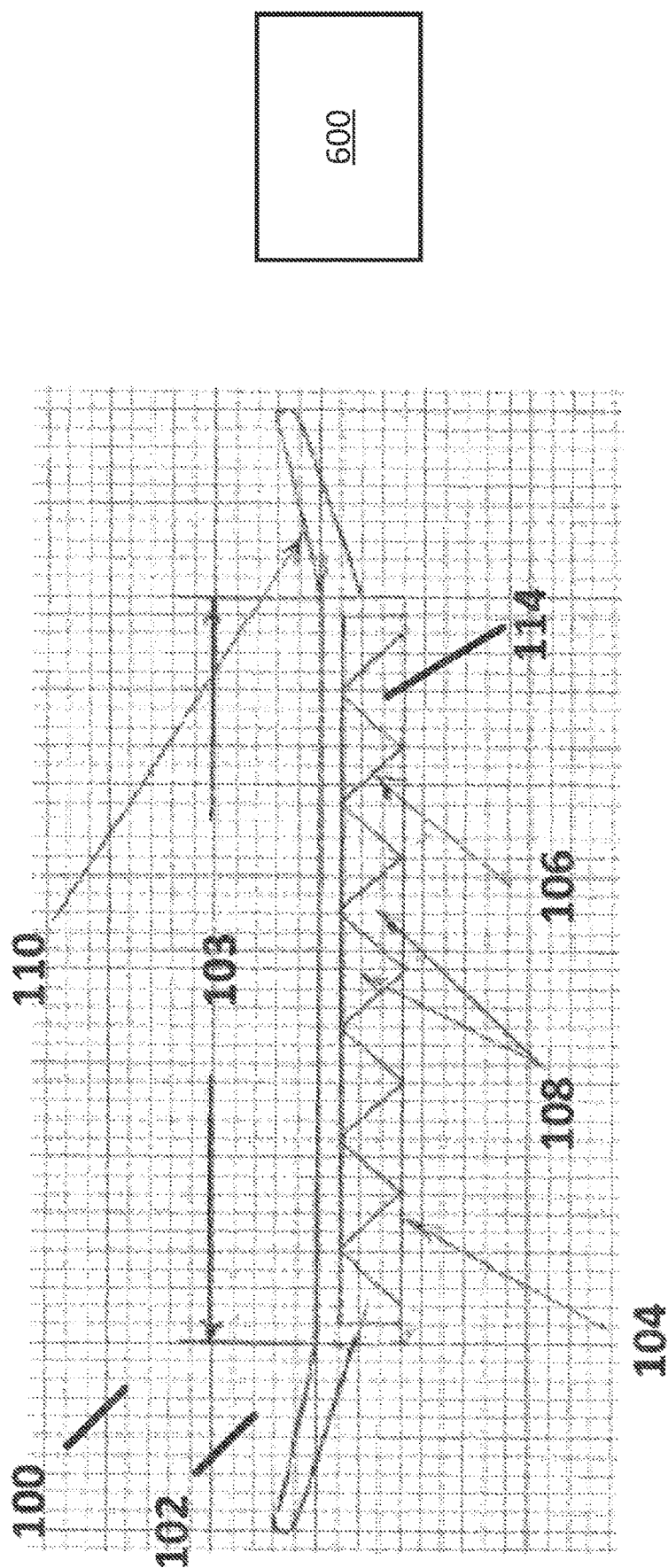
FIG. 6 is a side, cross-sectional view of an exemplary dish assembly with an electromagnetic induction heater proximate the dish assembly.

FIG. 6 is a side, cross-sectional view of a dish assembly that is identical to the dish assembly 100 in FIG. 1. FIG. 5, however, also shows an electromagnetic induction heater 600 proximate the dish assembly 100.

In general, in order to provide a good amount of useful heating for the intended purpose, it is desirable, in certain implementations at least, that the thermal storage area extends completely across (or at least substantially across) the area of the dish assembly on which hot or warm food is to be placed.

A number of embodiments of the invention nave been described. Nevertheless, it will be understood that various modifications may be made without departing from the spirit and scope of the invention.

For example, in the illustrated implementations, the dish 100 has an overall shape of a plate. However, in other implementations, the dish 100 can have a different shape. Indeed, the dish/dish assembly described herein could be virtually any type of product (e.g., a plate, a dish, a cup, a bowl, a serving board, a receptacle, etc.) that can be used to serve food or hold a product one wishes to keep warm. In this regard, the dish 100 can be any shape that is suitable to hold food or other product that is desirable to keep warm.

Any one or more of a variety of different materials can be used to form the various components of the dish and dish assembly described herein. For example, the dish housing (e.g., the upper and lower portions) can be virtually any kind of material. Typically, the dish housing is an electrically insulative material (i.e., a dielectric material) and, in some implementations, the material may be dishwasher safe. The material is also, generally, compatible with the phase-change material and the electrically-conductive element it contains. Moreover, the material is also generally suitable to withstand temperatures associated with any heat generated in the internal compartment. Finally, the material of the dish housing, in a typical implementation, conducts heat fairly well, at least through the wall that forms the food serving area.

The size, shape and relative dimensions of the various dish components can vary considerably. For example, the overall size of the dish can be quite large or quite small. The depth of the dish (e.g., from the lowest point on the food serving area to the upper edge of the rim) can be quite large or quite small. The size of the rim relative to the size of the food serving area can differ considerably from what is shown in the drawings contained herein. The size, both relative and actual, of the inner compartment can vary considerably from what is shown in the drawings and suggested herein. In one exemplary implementation, however, the inner compartment has a diameter that is between 70% and 90% of an overall diameter of the dish housing. The size and shape and contour of the electrically-conductive element can vary considerably from what is shown in the drawings and otherwise disclosed herein. In fact, in some implementations, a dish assembly may include more than one electrically-conductive element inside of it.

The overall shape of the dish assembly and/or one or more of its components can vary. For example, in some implementations, the dish assembly and the inner compartment have an overall round or cylindrical shape. In other implementations, one or both of those may be triangular, rectangular, or any other shape.

In a typical implementation, the inner compartment of the dish is a broad, shallow cavity on the underside extending under the full area which on the upper side would have hot food placed upon it. In some implementations, this shallow cavity may extend across an entirety, or a substantial entirety of the dish assembly, leaving no rim or only a very small rim.

The electrically-conductive element can be virtually any kind of electrically-conductive element that is suitable to be heated by an electromagnetic induction heater external to the dish assembly. Examples include metal wool, metal foil (e.g., with openings), a metal screen and a corrugated, mesh sheet.

Although heating is generally described herein as being implemented using an electromagnetic induction heater, other types of heating may be implemented to melt the phase-change material inside the dish assembly. For example, in some implementations, heating may be implemented using heat lamps, an oven or an open flame. Other types of heating may be possible as well.

For example, in some implementations, a thick metal plate is used for thermal storage. This plate can be heated in a conventional oven, for example, and the food is served in a close fitting plate on top of the metal thermal storage plate.

The dish assembly disclosed herein can be configured to stay warm and keep its food warm for a variety of different lengths of time. The length of time that a particular plate remains hot is generally dependent upon the amount of thermal storage capacity provided in the dish assembly. This is generally related to how much phase-change material is provided inside the dish assembly.

Typically, the thermal diffusivity (a combination of heat conductivity and heat capacity) of thermal storage media is poor, so that the surface of even a relatively thin layer of the freezing material can cool well below the melt-freeze point while the center is still molten, and indeed, superheated. It is therefore desirable, in some instances, to provide some thermally conductive additive in the storage cavity to enhance the transfer of heat across the heat storage layer during the cooling process. Metals are an appropriate material for this purpose since their heat conductivity is far higher than all but relatively expensive materials. Metal wools, foils, screens or corrugated sheet materials can all be used for this purpose.

In some exemplary heating systems, since the thermal storage medium is melted before the plate performs its intended function, energy equivalent to (or substantially equivalent to) that expected to be released during cooling is transferred into the storage medium from outside the cavity during a heating process. This heat can be transferred over a period of time from the outside by placing the plate on a hot surface, subjecting it to a blast of hot air, by immersion in a steam or hot water bath, or other means. However, in these situations, the rate at which heat can be transferred into the cavity across the storage enclosure will not be particularly fast even if the thermal diffusivity of the storage medium has been improved by the conductivity of an enhancement (if supplied). Unless very high surface temperatures can be allowed during the heating process, this heating process can be expected to take substantially as long as the effective cool-down time.

In order to decrease the heat-up time in these situations, it is advantageous to add the heat directly to the storage medium. This can be easily done if the thermal diffusivity enhancement in the storage medium is iron or steel and the enclosure of the storage medium is non-metallic. In that case an induction heater can be used, allowing much greater energy input and faster heat-up times. This process can be thought of as being similar to the process in a microwave oven, in which currents are induced in water contained in the food in the microwave field. In the induction heating process the heat is generated by electric currents induced in the iron bearing matrix distributed within the storage medium, so that little conduction is required within the storage medium itself. See FIG. 1.

It should be understood that relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely (e.g., for a measurable quantity this might mean 99% or more, 95% or more, 90% or more, 85% or more). For non-measurable quantities (e.g., a surface that is substantially parallel to another surface), substantial should be understood to mean completely or almost completely (e.g., deviating from parallel no more than a few (e.g., less than 3, 4 or 5) degrees.

Other implementations are within the scope of the claims.

What is claimed is:

1. A system comprising:
   a dish assembly comprising:
   a dish housing that defines an upwardly-facing, centrally-disposed food placement surface, upon which food can be placed, a rim that extends outward from and surrounds the food placement surface, and a sealed inner compartment, wherein the dish housing is an electrically insulating material;
   a phase-change material within the inner compartment and in direct physical contact with the electrically insulating material of the dish housing, wherein the phase-change material is a solid-to-liquid or liquid-to-gas phase-change material; and
   an electrically-conductive element immersed in, and thermally coupled to, the phase-change material inside the inner compartment,
   wherein the electrically-conductive element is selected from the group consisting of: a metal wool, a metal foil with openings, a metal screen and a corrugated, mesh sheet, physically configured such that when the phase-change material melts, the melted phase-change material flows freely through openings in the electrically-conductive element.

2. The system of claim 1, wherein the phase-change material is adapted to melt in response to the electrically-conductive element being heated by an electromagnetic induction heater.

3. The system of claim 2, wherein the electrically conductive element is sufficiently large that when the electrically conductive element is heated by the electromagnetic induction heater, all of the phase-change material melts.

4. The system of claim 2, wherein the phase-change material is sufficiently close to the food placement surface that heat emitted from the phase-change material as it freezes after having been melted is absorbed by food on the food placement surface.

5. The system of claim 1, wherein the phase-change material is a material selected from the group consisting of: a wax and a hydrated inorganic salt.

6. The system of claim 1, wherein the phase-change material is configured to change phase at a temperature in the range of 45 degrees Celsius to 80 degrees Celsius and, more preferably, in the range of 50 degrees Celsius to 70 degrees Celsius.

7. The system of claim 1, wherein the electrically conductive element does not change phase when the phase-change material changes phase.

8. The system of claim 1, wherein the phase-change material and the electrically-conductive element are completely enclosed by the dish housing.

9. The system of claim 1, wherein the phase-change material is in direct physical contact with a surface of the dish housing opposite the food placement surface, and wherein the dish housing is an electrically insulative material.

10. The system of claim 9, wherein the inner compartment has a diameter that is between 70% and 90% of a diameter of the dish housing.

11. The system of claim 1, wherein the inner compartment is enclosed by a cover-portion of the dish housing.

12. The system of claim 1, further comprising food in direct physical contact with the food placement surface.

13. The system of claim 1, wherein the inner compartment of the dish housing contains only the phase-change material, and the electrically-conductive material with nothing else in the inner compartment.

14. The system of claim 1, wherein the sealed inner compartments is sealed by virtue of either mating screw threads and a sealant, or an adhesive.

15. A system comprising:
   a dish for serving food or the like, the dish comprising:
   a dish housing that defines an upwardly-facing, centrally-disposed food placement surface, upon which the food or the like can be placed, a rim that extends outward from and surrounds the food placement surface, and a sealed inner compartment, wherein the dish housing is an electrically insulating material;
   a phase-change material within the inner compartment and in direct physical contact with the electrically insulating material of the dish housing, wherein the phase-change material is a solid-to-liquid phase-change material; and
   an electrically-conductive element immersed in, and thermally coupled to, the phase-change material inside the inner compartment, wherein the electrically-conductive element is selected from the group consisting of: a metal wool, a metal foil with openings, a metal screen and a corrugated, mesh sheet; and an induction heater, outside the dish housing, but proximate the dish, wherein the induction heater is operable to heat the electrically-conductive element and thereby melt the phase-change material, wherein the phase-change material, when melted, flows freely through openings in the electrically-conductive element.

16. The system of claim 15, wherein the sealed inner compartment is sealed by virtue of either mating screw threads and a sealant, or an adhesive.

17. The system of claim 15, wherein the induction heater melts the phase-change material by producing a changing electromagnetic field that induces electrical current flow in the electrically-conductive element to heat and melt the phase-change material within the housing when the dish is placed on the induction heater.

18. The system of claim 17, wherein the electrically conductive element is sufficiently large that when the electrically conductive element is heated by the electromagnetic induction heater, all of the phase-change material melts.

19. The system of claim 17, wherein the phase-change material is sufficiently close to the food placement surface that heat emitted from the phase-change material as it freezes after having been melted is absorbed by food on the food placement surface.

20. The system of claim 15, wherein the phase-change material is a material selected from the group consisting of: a wax and a hydrated inorganic salt.

21. The system of claim 15, wherein the phase-change material is configured to change phase at a temperature in the range of 45 degrees Celsius to 80 degrees Celsius and, more preferably, in the range of 50 degrees Celsius to 70 degrees Celsius.

22. The system of claim 15, wherein the electrically conductive element does not change phase when the phase-change material changes phase.

23. The system of claim 15, wherein the surface of the dish housing in direct physical contact with the phase-change material is opposite the food placement surface.

24. The system of claim 15, wherein the phase-change material and the electrically-conductive element are completely enclosed by the dish housing.

25. The system of claim 15, wherein the inner housing has a diameter that is between 70% and 90% of a diameter of the dish housing.

26. The system of claim 15, further comprising food in direct physical contact with the food placement surface.

27. The system of claim 15, wherein the inner compartment of the dish housing contains only the phase-change material, and the electrically-conductive material with nothing else in the inner compartment, and wherein the induction heater is outside the dish housing.

28. A method comprising:

providing a heat retaining dish assembly for serving food, the heat retaining dish assembly comprising:

a dish housing that defines an upwardly-facing, centrally disposed food placement surface, upon which the food can be placed, a rim that extends outward from and surrounds the food placement surface, and a sealed inner compartment, wherein the dish housing is an electrically insulating material;

a phase-change material within the inner compartment, wherein the phase-change material is in direct physical contact with the electrically insulating material of the dish housing including in direct physical contact with a surface of the dish housing opposite the food placement surface, wherein the phase-change material is a solid-to-liquid phase-change material; and an electrically-conductive element inside the inner compartment and thermally coupled to the phase-change material, wherein the electrically-conductive element is immersed in the phase-change material within the inner compartment and is selected from the group consisting of: a metal wool, a metal foil with openings, a metal screen and a corrugated, mesh sheet;

providing an electromagnetic induction heater outside the dish housing, but proximate the dish, wherein the induction heater is operable to heat the electrically-conductive element and thereby melt the phase-change material;

melting the phase-change material with an electromagnetic induction heater such that, after melting, the phase-change material flows freely through openings in the electrically-conductive element; and placing the food in direct physical contact with the food placement surface, wherein, after the phase-change material melts, the phase-change material gives off heat to the food that is in direct physical contact with the food placement surface and, over time, the phase-change material freezes.

29. The method of claim 28, wherein the phase-change material is melted by applying a changing electromagnetic field to the electrically-conductive element with the electromagnetic induction heater, wherein the changing electromagnetic field induces electrical current flow in the electrically-conductive element to create heat and melt the phase-change material.

\* \* \* \* \*